(12) United States Patent
Shimizu et al.

(10) Patent No.: US 12,504,730 B2
(45) Date of Patent: Dec. 23, 2025

(54) SCADA WEB HMI SYSTEM

(71) Applicant: TMEIC CORPORATION, Tokyo (JP)

(72) Inventors: Ryo Shimizu, Tokyo (JP); Akira Nojima, Tokyo (JP); Nobuo Shimizu, Tokyo (JP)

(73) Assignee: TMEIC CORPORATION, Tokyo (JP)

( * ) Notice: Subject to any disclaimer, the term of this patent is extended or adjusted under 35 U.S.C. 154(b) by 440 days.

(21) Appl. No.: 18/003,157

(22) PCT Filed: Jun. 10, 2021

(86) PCT No.: PCT/JP2021/022152
§ 371 (c)(1),
(2) Date: Dec. 23, 2022

(87) PCT Pub. No.: WO2022/259473
PCT Pub. Date: Dec. 15, 2022

(65) Prior Publication Data
US 2023/0259087 A1 Aug. 17, 2023

(51) Int. Cl.
*G05B 19/042* (2006.01)
(52) U.S. Cl.
CPC .. *G05B 19/042* (2013.01); *G05B 2219/24215* (2013.01)
(58) Field of Classification Search
CPC ........ G05B 19/042; G05B 2219/24215; G05B 23/027; G05B 19/058; G05B 23/0272; Y02P 90/02; G06F 13/00; G06Q 10/00
USPC .......................................................... 714/719
See application file for complete search history.

(56) References Cited

U.S. PATENT DOCUMENTS

| 5,583,793 | A | * | 12/1996 | Gray | ....................... | H04L 43/00 |
| | | | | | | 340/3.1 |
| 2014/0031958 | A1 | * | 1/2014 | Loganathan | ....... | G05B 23/0229 |
| | | | | | | 700/79 |
| 2014/0361885 | A1 | * | 12/2014 | Szudajski | ........... | H04L 41/0609 |
| | | | | | | 340/508 |

(Continued)

FOREIGN PATENT DOCUMENTS

| EP | 2530537 A2 | 12/2012 |
| JP | 2017-27211 A | 2/2017 |
| WO | 2021/015024 A1 | 1/2021 |

OTHER PUBLICATIONS

International Search Report and Written Opinion mailed on Sep. 7, 2021, received for PCT Application PCT/JP2021/022152, filed on Jun. 10, 2021, 10 pages including English Translation.

(Continued)

*Primary Examiner* — James C Kerveros
(74) *Attorney, Agent, or Firm* — XSENSUS LLP

(57) ABSTRACT

An object of the present invention is to provide a SCADA web HMI system that can reduce a load for processing an alarm signal in a large-scale system. An HMI server apparatus performs buffering processing and alarm filtering processing. In the buffering processing, in a case where a received block data includes a set of alarm signals, at least the set of alarm signals included in the block data is temporarily stored in an alarm buffer memory. In the alarm filtering processing, the set of alarm signals stored in the alarm buffer memory is taken out for every second period that is longer than a first period, and the alarm signal having a value varied from a previous value is extracted from the taken-out set of alarm signals.

19 Claims, 10 Drawing Sheets

(56) References Cited

U.S. PATENT DOCUMENTS

| | | | | |
|---|---|---|---|---|
| 2015/0346706 A1* | 12/2015 | Gendelman | ........ | G05B 23/0208 |
| | | | | 700/79 |
| 2016/0330225 A1* | 11/2016 | Kroyzer | ................. | G06N 20/00 |
| 2021/0382989 A1* | 12/2021 | Wei | ....................... | G06F 21/552 |
| 2023/0164596 A1* | 5/2023 | Singh | .................... | H04W 24/04 |
| | | | | 370/216 |
| 2024/0427853 A1* | 12/2024 | Madisetti | .............. | G06F 21/575 |
| 2025/0173406 A1* | 5/2025 | Madisetti | ............. | G05B 19/058 |

OTHER PUBLICATIONS

Office Action issued on Mar. 6, 2024, in corresponding Indian patent Application No. 202317001139, 5 pages.

\* cited by examiner

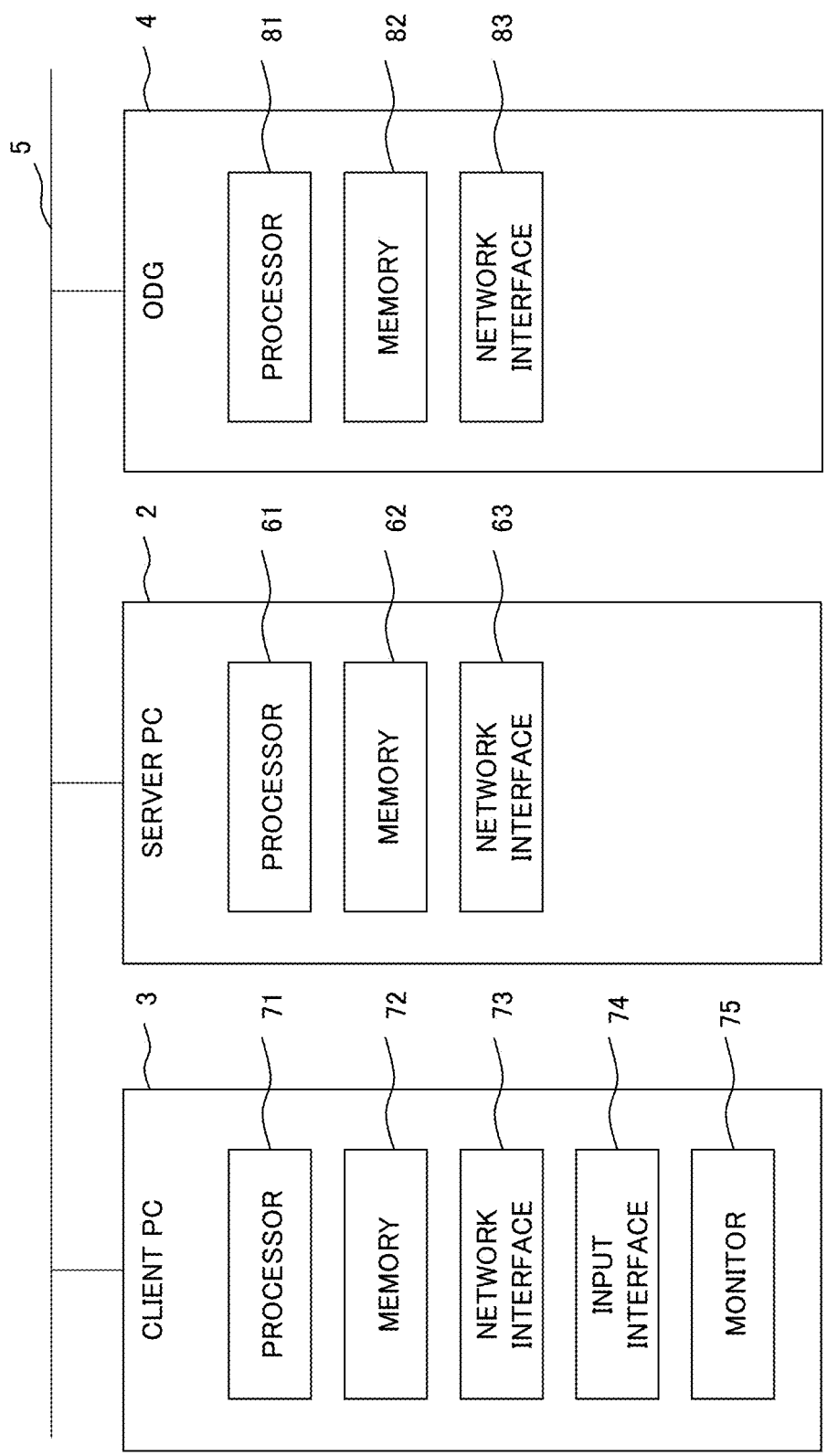

SCADA WEB HMI SYSTEM

CROSS-REFERENCE TO RELATED APPLICATION

The present application is based on PCT filing PCT/JP2021/022152, filed Jun. 10, 2021, the entire contents of which are incorporated herein by reference.

FIELD

The present invention relates to a SCADA web HMI system, and particularly to a technique to reduce a processing load in a large-scale system.

BACKGROUND

A SCADA (Supervisory Control And Data Acquisition) is known as a mechanism to monitor and control a social infrastructure system. Examples of the social infrastructure system include a steel rolling system, a power transmission and transformation system, a water and sewage treatment system, a building management system, and a road system.

The SCADA is a type of an industrial control system, and performs system monitoring, process control, and data collection by a computer. The SCADA is required to have quick responsiveness (real-time property) corresponding to processing performance of the system.

The SCADA commonly includes the following sub-systems.

(1) HMI (Human Machine Interface)

An HMI is a mechanism that presents data on a monitoring object apparatus to an operator, to enable the operator to monitor and control the monitoring object apparatus.

(2) Supervisory Control System

A supervisory control system includes a programmable logic controller (PLC) and the like. The supervisory control system collects data on the monitoring object apparatus, and transmits a control command to the monitoring object apparatus.

(3) Remote Input/Output Apparatus (Remote Input Output: RIO)

A remote input/output apparatus is connected to a sensor installed in the monitoring object apparatus, converts a signal of the sensor into digital data, and transmits the digital data to the supervisory control system.

(4) Communication Base

A communication base connects the supervisory control system and the remote input/output apparatus.

As an example of the SCADA HMI sub-systems, PTL 1 discloses a system including an HMI client apparatus and an HMI server apparatus. In the existing SCADA disclosed in PTL 1, the HMI server apparatus transmits data (input/output signals and alarm signals) received from the PLC to the HMI client apparatus, and stores all of collected data as historical data. The input/output signals are signals relating to the monitoring object apparatus (field apparatuses configuring industrial plant), and include an actuator control signal and a sensor detection signal.

CITATION LIST

Patent Literature

[PTL 1] JP 2017-27211 A

SUMMARY

Technical Problem

Issues in development of an HMI sub-system that is one of the above-described sub-systems are described.

In a large-scale system, the HMI sub-system connects two hundred thousand or more signals to the PLC in some cases. An existing HMI server apparatus performing both of supervisory control and data collection requires a high-performance processor and a large-capacity memory in order to process a number of signals in real time. Therefore, it is desirable to realize the HMI sub-system applicable to the large-scale system at low cost.

To realize cost reduction of the SCADA HMI sub-system, the inventers of the present application developed a browser-based SCADA HMI sub-system. As a result, it is possible to realize an HMI screen as a web application operating on a web browser.

One of advantages of realizing the HMI screen on the web browser is that data can be easily acquired from different web servers by switching a URL (including port number). In other words, it is possible to acquire data on a history screen from an online data gathering apparatus (ODG) that collects and stores all of PLC data, and to acquire data on a supervisory screen requiring real-time property from the HMI server apparatus. A function relating to the history that is a part of a SCADA function is separated and is assigned to the online data gathering apparatus, which enables the HMI server apparatus to be specialized for a real-time supervisory function. To process a number of signals by the HMI server apparatus at low cost, it is desirable to reduce a load for processing the input/output signals (including actuator control signal and sensor detection signal) and the alarm signals.

The existing HMI server apparatus equivalently processes the input/output signals and the alarm signals in real time. The input/output signals must be reflected on the supervisory screen as quickly as possible (several milliseconds to several hundred milliseconds) without manual operation. However, the alarm signals are issued to instruct requests to an HMI operator. Therefore, the alarm signals do not require frequent display change that cannot be dealt by a person, and do not require real-time property like the input/output signals.

The present invention is made to solve the above-described issues, and an object of the present invention is to provide a SCADA web HMI system that can reduce a load for processing an alarm signal in a large-scale system.

Solution to Problem

A first aspect relates to a SCADA web HMI system.

The SCADA web HMI system includes a programmable logic controller (hereinafter, PLC), an HMI client apparatus, and an HMI server apparatus that are connected through a computer network.

The PLC transmits block data to the computer network for every first period. The block data includes at least one of a set of input/output signals relating to field apparatuses configuring an industrial plant and a set of alarm signals.

The HMI client apparatus includes a monitor displaying a web browser, and a client processor configured to execute the web browser displaying a screen including arranged alarm parts.

The web browser changes display states of the alarm parts based on the alarm signals received from the HMI server apparatus.

The HMI server apparatus includes a server memory storing an alarm buffer memory, and a server processor performing alarm management.

The server processor is configured to perform reception processing, buffering processing, alarm filtering processing, and transmission processing.

In the reception processing, the block data transmitted from the PLC is received for every first period.

In the buffering processing, in a case where the received block data includes the set of alarm signals, at least the set of alarm signals included in the block data is temporarily stored in the alarm buffer memory.

In the alarm filtering processing, the set of alarm signals stored in the alarm buffer memory is taken out for every second period that is longer than the first period, and the alarm signal having a value varied from a previous value is extracted from the taken-out set of alarm signals.

In the transmission processing, the extracted alarm signal is transmitted to the web browser displayed on the monitor.

A second aspect further includes the following characteristics in addition to the first aspect.

In the buffering processing, in the case where the received block data includes the set of alarm signals, the received block data is temporarily stored in the alarm buffer memory.

In the alarm filtering processing, the block data stored in the alarm buffer memory is taken out for every second period. In the alarm filtering processing, the set of alarm signals is extracted from the taken-out block data, and the alarm signal having a value varied from a previous value is extracted from the extracted set of alarm signals.

A third aspect further includes the following characteristics in addition to the first aspect.

In the buffering processing, in the case where the received block data includes the set of alarm signals, the set of alarm signals included in the block data is extracted, and the extracted set of alarm signals is temporarily stored in the alarm buffer memory.

A fourth aspect further includes the following characteristics in addition to any of the first to third aspects.

The block data is transmitted from the PLC by multicast or broadcast for every first period.

A fifth aspect further includes the following characteristics in addition to the fourth aspect.

The SCADA web HMI system further includes an online data gathering apparatus.

The online data gathering apparatus periodically receives the block data from the PLC, and stores historical data on all of signals included in the block data.

The online data gathering apparatus transmits the historical data in response to a request from the web browser.

The web browser requests the historical data to the online data gathering apparatus in a case where the screen currently displayed on the web browser is a history screen.

The web browser displays the historical data received from the online data gathering apparatus on the history screen.

Advantageous Effects of Invention

According to the first aspect, the processing is performed on the alarm signal not requiring the real-time property like the input/output signals for a period (second period) longer than a reception period (first period) of the block data, which makes it possible to optimize a data update period and to reduce the processing load. Further, since the block data including no alarm signal is discarded and is not processed, it is possible to reduce the processing load.

According to the second aspect, the block data including the alarm signals is temporarily stored in the alarm buffer memory in the reception period (first period) of the block data, and the alarm signal is extracted from the stored block data in the second period. This makes it possible to reduce the processing load in reception.

According to the third aspect, the alarm signals extracted from the block data are temporarily stored in the alarm buffer memory in the reception period (first period) of the block data. This makes it possible to reduce a size of the alarm buffer memory and to reduce a memory usage.

According to the fourth aspect, an apparatus added to the computer network can receive the block data without influencing the existing apparatus.

According to the fifth aspect, the online data gathering apparatus can store the historical data on all of the signals, and the web browser of the HMI client apparatus can acquire the historical data from the online data gathering apparatus. Accordingly, it is sufficient for the HMI server apparatus to process only data necessary for real-time monitoring, which makes it possible to reduce the processing load of the HMI server apparatus.

BRIEF DESCRIPTION OF DRAWINGS

FIG. 10 is a block diagram illustrating hardware configuration examples of an HMI server apparatus, HMI client apparatus, and an online data gathering apparatus.

DESCRIPTION OF EMBODIMENTS

Figure 1:
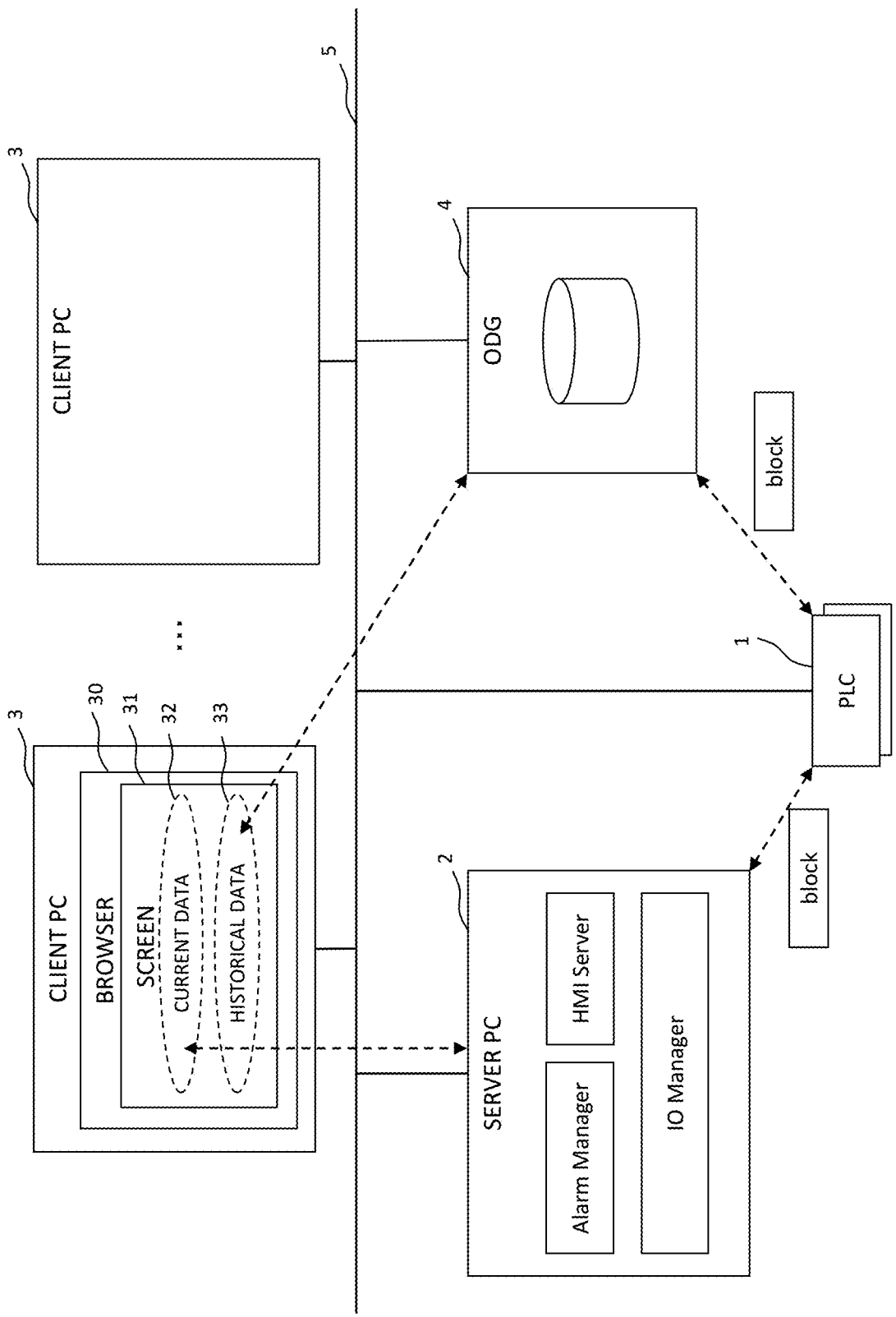
FIG. 1 is a diagram to explain a configuration example of a SCADA web HMI system according to Embodiment 1 of the present invention.

Some embodiments of the present invention are described in detail below with reference to drawings. Note that elements common to the drawings are denoted by the same reference numerals, and repetitive descriptions of the elements are omitted.

Embodiment 1

1-1. SCADA Web HMI System

FIG. 1 is a diagram to explain a configuration example of a SCADA web HMI system according to Embodiment 1. The SCADA web HMI system illustrated in FIG. 1 includes a PLC 1, an HMI server apparatus 2, an HMI client apparatus 3, and an online data gathering apparatus (ODG) 4 that are connected to one another through a computer network 5. The computer network 5 is, for example, Ethernet®.

The PLC 1 is connected to field apparatuses (including actuator and sensor) configuring an industrial plant, through an unillustrated control network. The PLC 1 transmits a packet including block data to the computer network 5 by multicast or broadcast for every first period. The block data is a set of PLC signals. One piece of block data includes several tens to several hundred PLC signals. Types of the PLC signals include an input/output signal (including actuator control signal and sensor detection signal) and an alarm signal. The block data includes at least one of a set of input/output signals and a set of alarm signals. The total number of alarm signals is smaller than the total number of input/output signals.

The block data is periodically transmitted irrespective of whether a value of each of the PLC signals is varied from a previous value. Therefore, even in a case where the transmitted packet including the block data is lost, the packet is retransmitted in a next transmission period, and the latest state is reflected on the HMI server apparatus 2 and the online data gathering apparatus 4.

The HMI client apparatus 3 includes a processor 71, a memory 72, and a monitor 75 illustrated in FIG. 10 described below. The processor 71 is configured to execute a web browser 30 displaying a screen 31 on which display parts are arranged, by executing programs stored in the memory 72. The monitor 75 displays the web browser 30.

The web browser 30 can switch a connection destination (HMI server apparatus 2 or online data gathering apparatus 4) based on a URL, and can acquire various kinds of information on an HTML document about the screen 31 from a web server designated by the URL. The screen 31 includes a supervisory screen 32 requiring real-time property, and a history screen 33 displaying historical data.

In a case where the screen 31 currently displayed on the web browser 30 is the supervisory screen 32, the web browser 30 changes display states of the display parts based on input/output signals received from the HMI server apparatus 2. The change in the display state is change in, for example, numerical value, character, color, and shape. Further, the web browser 30 changes display states of alarm parts arranged on the screen 31 based on alarm signals received from the HMI server apparatus 2.

In a case where the screen 31 currently displayed on the web browser 30 is the history screen, the web browser 30 issues a historical data request to the online data gathering apparatus 4. The web browser 30 displays historical data received from the online data gathering apparatus 4, on the history screen 33.

The online data gathering apparatus 4 includes a processor 81 and a memory 82 illustrated in FIG. 10 described below. The processor 81 is configured to execute web server processing and historical data management processing by executing programs stored in the memory 82.

The online data gathering apparatus 4 periodically receives block data from the PLC 1. In the historical data management processing by the online data gathering apparatus 4, historical data on all of signals included in the received block data is stored in the memory 82 (including database). In the web server processing by the online data gathering apparatus 4, the historical data is transmitted in response to the request from the web browser 30. Further, the online data gathering apparatus 4 receives an alarm packet from the HMI server apparatus 2 and stores the alarm packet.

1-2. Overview of Functions of HMI Server Apparatus According to Embodiment 1

Figure 2:
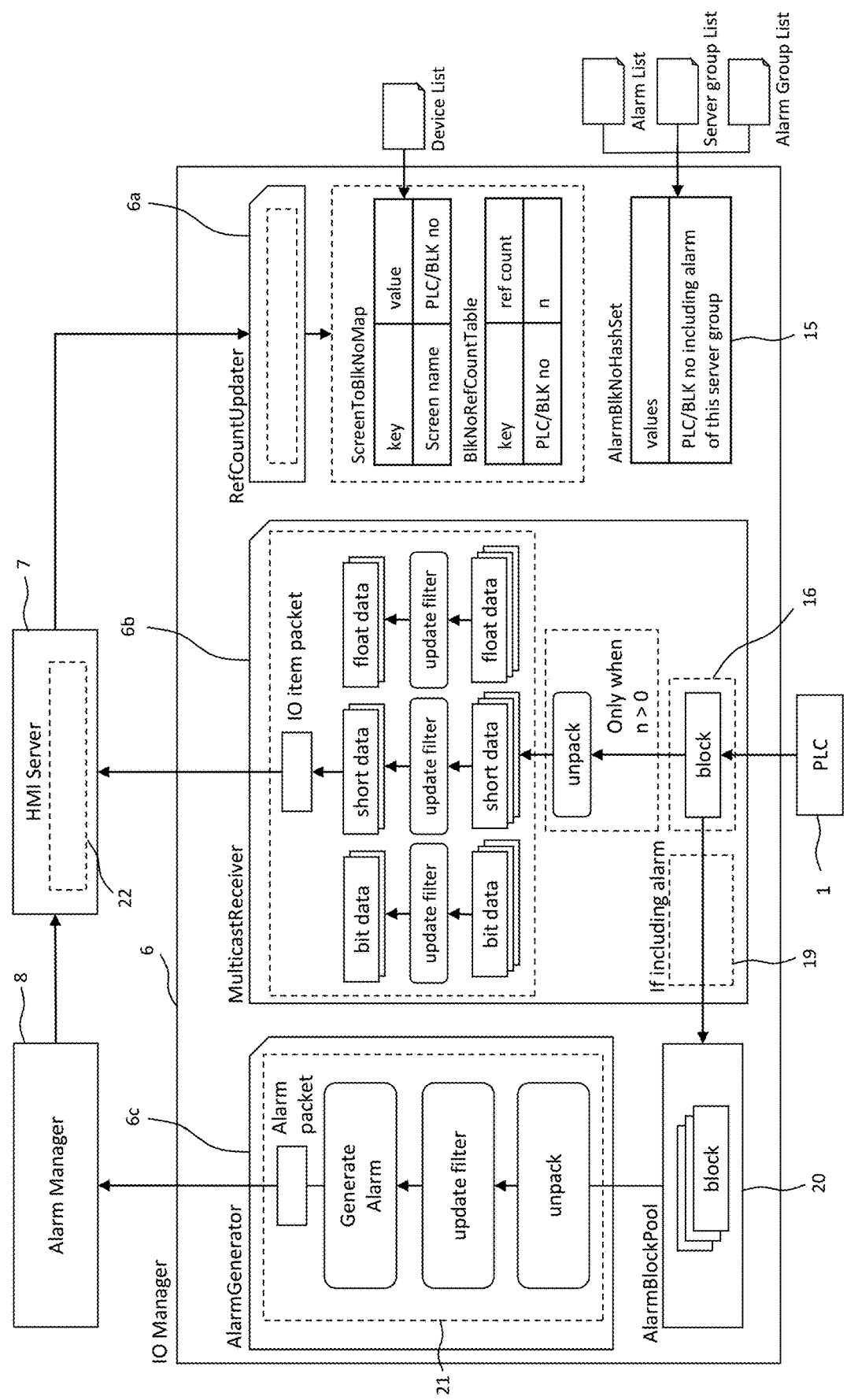
FIG. 2 is a block diagram illustrating overview of functions held by an HMI server apparatus according to Embodiment 1 of the present invention.

FIG. 2 is a block diagram illustrating overview of functions held by the HMI server apparatus 2 according to Embodiment 1. The HMI server apparatus 2 includes a processor 61 and a memory 62 illustrated in FIG. 10 described below. The processor 61 performs various kinds of processing, and the memory 62 stores various kinds of information. The processor 61 executes an input/output management process 6, an HMI server process 7, an alarm management process 8, and the like by executing programs stored in the memory 62. The input/output management process 6, the HMI server process 7, and the alarm management process 8 can mutually exchange data through interprocess communication. The alarm management process 8 transmits a generated alarm packet to the HMI server process 7 and the online data gathering apparatus 4. The input/output management process 6 executes a reference count update thread 6a, a multicast receiver thread 6b, and an alarm generation thread 6c in parallel.

The memory 62 further stores alarm block information 15 and an alarm buffer memory 20. The alarm block information 15 is a list in which block numbers of block data including alarm signals are predetermined. The alarm buffer memory 20 is a storage area that can temporarily store data.

The input/output management process 6 illustrated in FIG. 2 receives block data from the PLC 1 for every first period, extracts, from the block data, only input/output signals relating to the screen 31 currently displayed on the web browser 30, and transmits the input/output signals to the HMI server process 7. In other words, the input/output signals requiring high real-time property are processed for every first period.

The input/output management process 6 performs reception processing 16, buffering processing 19, and alarm filtering processing 21 on the alarm signals.

In the reception processing 16, the block data transmitted from the PLC 1 is received for every first period. The first period is, for example, several milliseconds to several hundred milliseconds.

In the buffering processing 19, in a case where a set of alarm signals is included in the received block data, at least the set of alarm signals included in the block data is temporarily stored in the alarm buffer memory 20.

In the alarm filtering processing 21, the set of alarm signals stored in the alarm buffer memory 20 is taken out for every second period that is longer than the first period. Further, in the alarm filtering processing 21, alarm signals each having a value varied from a previous value are extracted from the taken-out set of alarm signals. The second period is, for example, several seconds.

The HMI server process 7 performs web server processing and transmission processing 22.

In the transmission processing 22, the extracted input/output signals and the extracted alarm signals are transmitted to the web browser 30 displayed on the monitor 75 (FIG. 10).

1-3. Buffering Processing According to Embodiment 1

Figure 3:
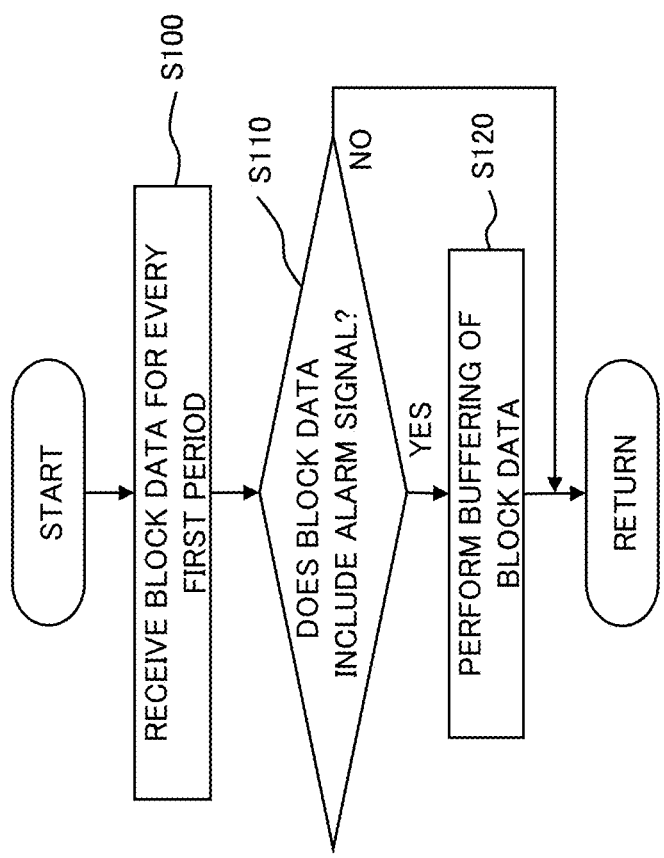
FIG. 3 is a flowchart to explain buffering processing according to Embodiment 1 of the present invention.
Figure 5:
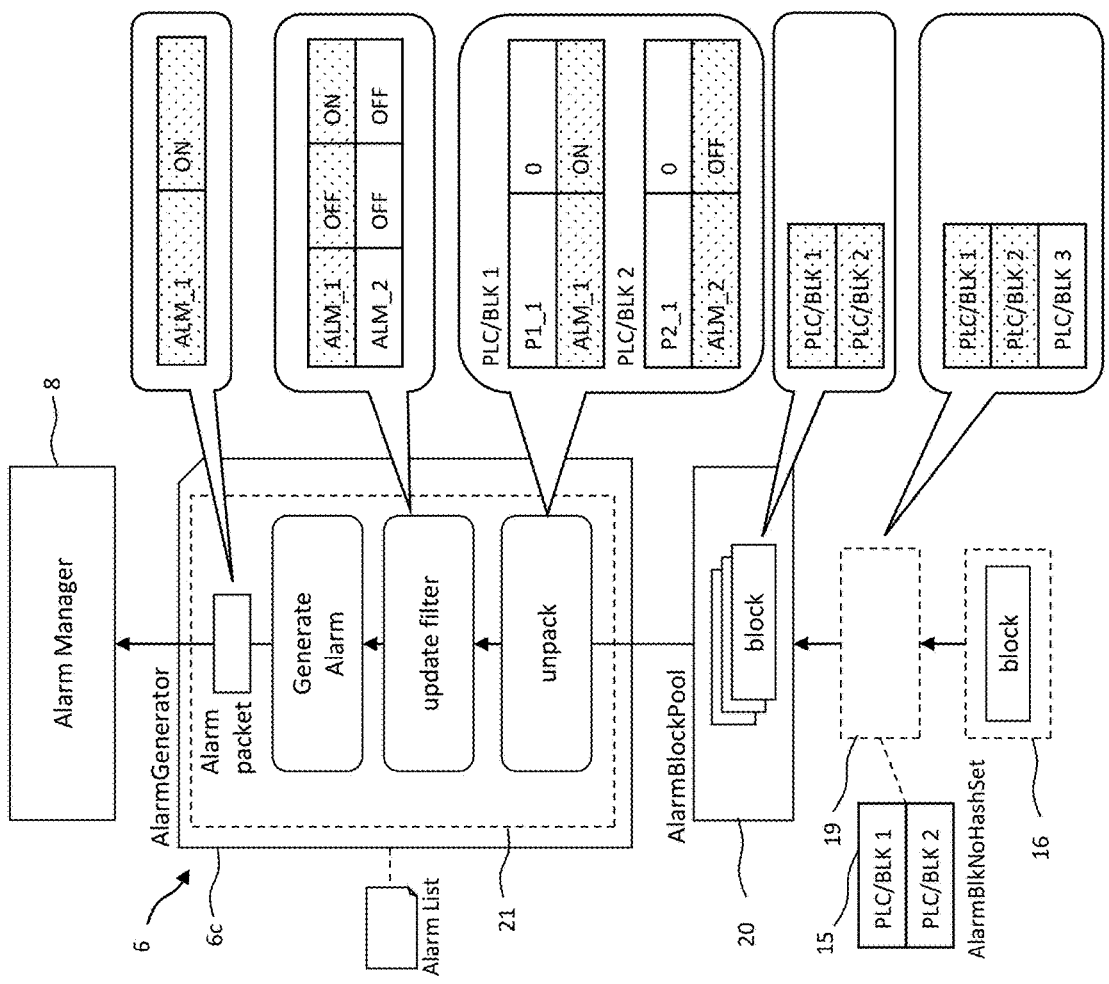
FIG. 5 is a diagram to explain specific examples of the buffering processing and the alarm filtering processing according to Embodiment 1 of the present invention.

First, the buffering processing 19 illustrated in FIG. 2 is described with reference to FIG. 3 and FIG. 5. FIG. 3 is a flowchart to explain the buffering processing 19 according to Embodiment 1. FIG. 5 is a diagram to explain a specific example of the buffering processing 19 according to Embodiment 1. A flow illustrated in FIG. 3 is repeatedly performed for every first period.

In step S100, in the reception processing 16, the block data transmitted from the PLC 1 is received for every first period.

In the example illustrated in FIG. 5, in the reception processing 16, the block data (block number "PLC/BLK 1") is received in the first period of a first time. In the reception processing 16, the block data (block number "PLC/BLK 2") is received in the first period of a second time. In the reception processing 16, the block data (block number "PLC/BLK 3") is received in the first period of a third time.

In step S110, in the buffering processing 19, it is determined whether a set of alarm signals is included in the received block data, by referring to the alarm block information 15. As a result, only the block data including alarm signals is extracted. In a case where a set of alarm signals is included in the received block data, processing in step S120 is performed on the received block data. In contrast, in a case where a set of alarm signals is not included in the received block data, the received block data is discarded, and the flow is terminated. In a case where the determination condition in step S110 is not established, the block data can be discarded, which can reduce a load by the subsequent processing.

In the example illustrated in FIG. 5, as block numbers of the block data including alarm signals, "PLC/BLK 1" and "PLC/BLK 2" are registered in the alarm block information 15. Therefore, the processing in step S120 is then performed on the block data having the block number "PLC/BLK 1" and the block data having the block number "PLC/BLK 2" registered in the alarm block information 15. In contrast, the block data having the block number "PLC/BLK 3" not registered in the alarm block information 15 is discarded.

In step S120, in the buffering processing 19, the received block data is temporarily stored in the alarm buffer memory 20. A processing time required for copying the block data in the alarm buffer memory 20 is sufficiently short, and the total number of alarm signals is smaller than the total number of input/output signals. Therefore, the processing does not inhibit the real-time processing of the input/output signals.

In the example illustrated in FIG. 5, two pieces of block data (block numbers "PLC/BLK 1" and "PLC/BLK 2") are temporarily stored in the alarm buffer memory 20.

1-4. Alarm Filtering Processing According to Embodiment 1

Figure 4:
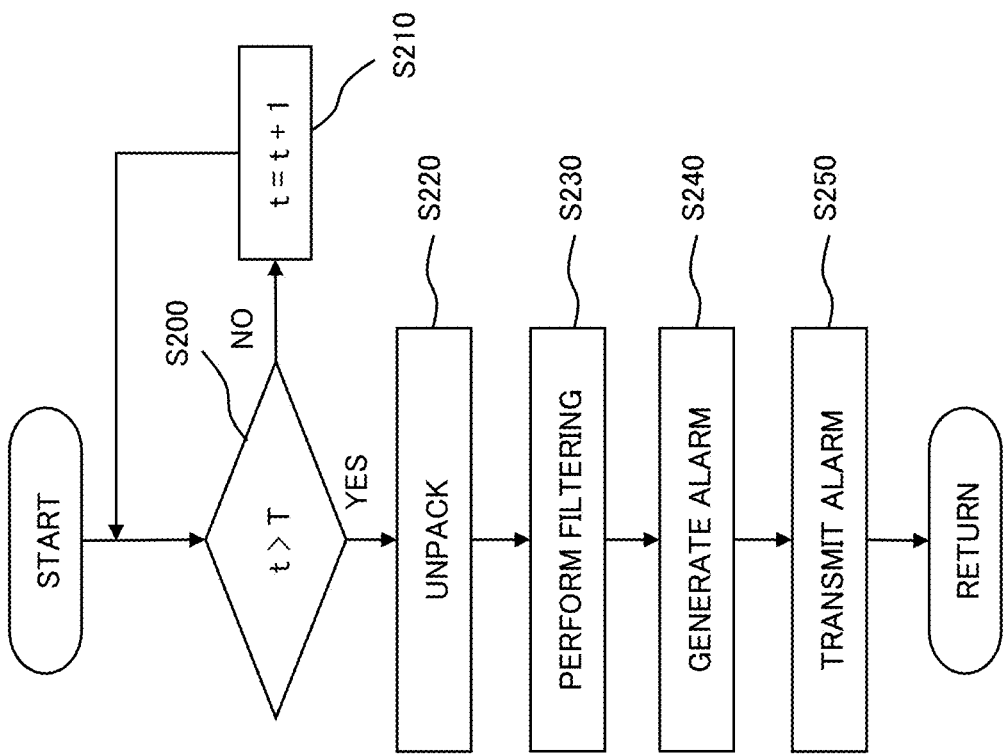
FIG. 4 is a flowchart to explain alarm filtering processing according to Embodiment 1 of the present invention.

Next, the alarm filtering processing 21 illustrated in FIG. 2 is described with reference to FIG. 4 and FIG. 5. FIG. 4 is a flowchart to explain the alarm filtering processing 21 according to Embodiment 1. FIG. 5 is a diagram to explain a specific example of the alarm filtering processing 21 according to Embodiment 1. A flow illustrated in FIG. 4 is repeatedly performed for every second period that is longer than the first period. The processing is performed on the alarm signals that do not require the real-time property like the input/output signals, for a period (second period) longer than the processing period (first period) of the input/output signals, which makes it possible to optimize a data update period.

In step S200, in the alarm filtering processing 21, it is determined whether a current count value t has reached a prescribed count value T corresponding to the second period. In a case where the determination condition is not established, the current count value t is incremented, and the processing in step S210 is performed again. In contrast, in a case where the determination condition is established, namely, in a case where the second period has elapsed, processing in step S220 is then performed.

In step S220, in the alarm filtering processing 21, the block data stored in the alarm buffer memory 20 is taken out, the taken-out block data is unpacked, and the set of alarm signals is extracted.

In the example illustrated in FIG. 5, two pieces of block data (block numbers "PLC/BLK 1" and "PLC/BLK 2") are unpacked, and alarm signals (ALM_1 and ALM_2) are extracted among four PLC signals (P1_1, ALM_1, P2_1, and ALM_2).

In step S230, in the alarm filtering processing 21, only the alarm signals each having a value varied from a previous value are extracted from the extracted set of alarm signals, based on filtering information. The filtering information includes the previous values of the respective alarm signals, and is stored in the memory 62. In a case where the previous value and the current value of an alarm signal are different from each other, operation by an HMI operator is necessary. Therefore, it is necessary to transmit the alarm signal varied in value, to the HMI server process 7. In contrast, in a case where the previous value and the current value of the alarm signal are equal to each other, such an alarm signal can be discarded, which makes it possible to reduce a load by the subsequent processing.

In the example illustrated in FIG. 5, out of the above-described two alarm signals (ALM_1 and ALM_2), the alarm signal (ALM_1) is a signal having a value varied from the previous value. In contrast, the alarm signal (ALM_2) is discarded because the previous value and the current value are equal to each other.

In step S240, in the alarm filtering processing 21, an alarm packet including the extracted alarm signals is generated.

In the example illustrated in FIG. 5, an alarm packet including the alarm signal (ALM_1) is generated.

In step S250, in the transmission processing 22, the alarm packet is transmitted to the web browser 30 displayed on the monitor 75 (FIG. 10).

1-5. Effects

As described above, according to the buffering processing 19, only the block data including the alarm signals is temporarily stored in the alarm buffer memory 20, and the block data including no alarm signal is discarded. Since unnecessary data is discarded in units of block data, an effect to reduce a processing load is large especially in a large-scale system. According to the alarm filtering processing 21, the processing is performed on the alarm signals that do not require the real-time property like the input/output signals, for the period (second period) longer than the processing period (first period) of the input/output signals, which makes it possible to optimize the data update period. Further, according to the alarm filtering processing 21, only the alarm signals each having the value varied from the previous value can be extracted. This makes it possible to discard the alarm signal having a value not varied from the previous value to reduce the load by the subsequent processing, and to reduce the data amount transmitted to the web browser. Including these processing makes it possible to configure an HMI system not requiring a high-performance CPU and a large-capacity memory.

Further, the online data gathering apparatus 4 can store the historical data on all of the signals, and the web browser 30 of the HMI client apparatus 3 can acquire the historical data from the online data gathering apparatus 4. Therefore, it is sufficient for the HMI server apparatus 2 to process only data necessary for the real-time monitoring. This makes it possible to reduce the processing load of the HMI server apparatus.

Embodiment 2

2-1. Overview of Embodiment 2

Next, Embodiment 2 of the present invention is described with reference to FIG. 6 to FIG. 9.

In Embodiment 1 described above, after the block data including the alarm signals is temporarily stored in the alarm buffer memory 20, unpack processing is performed. In the case of this method, unnecessary input/output signals other than the alarm signals are also included because the whole of the block data is included in the alarm buffer memory 20. It is desirable to reduce a memory usage used for the alarm buffer memory 20 in order to reduce the cost.

Therefore, in the present embodiment, the unpack processing is performed before the block data is stored in the alarm buffer memory 20, and only the alarm signals are stored in the alarm buffer memory 20.

2-2. Overview of Functions of HMI Server Apparatus According to Embodiment 2

Figure 6:
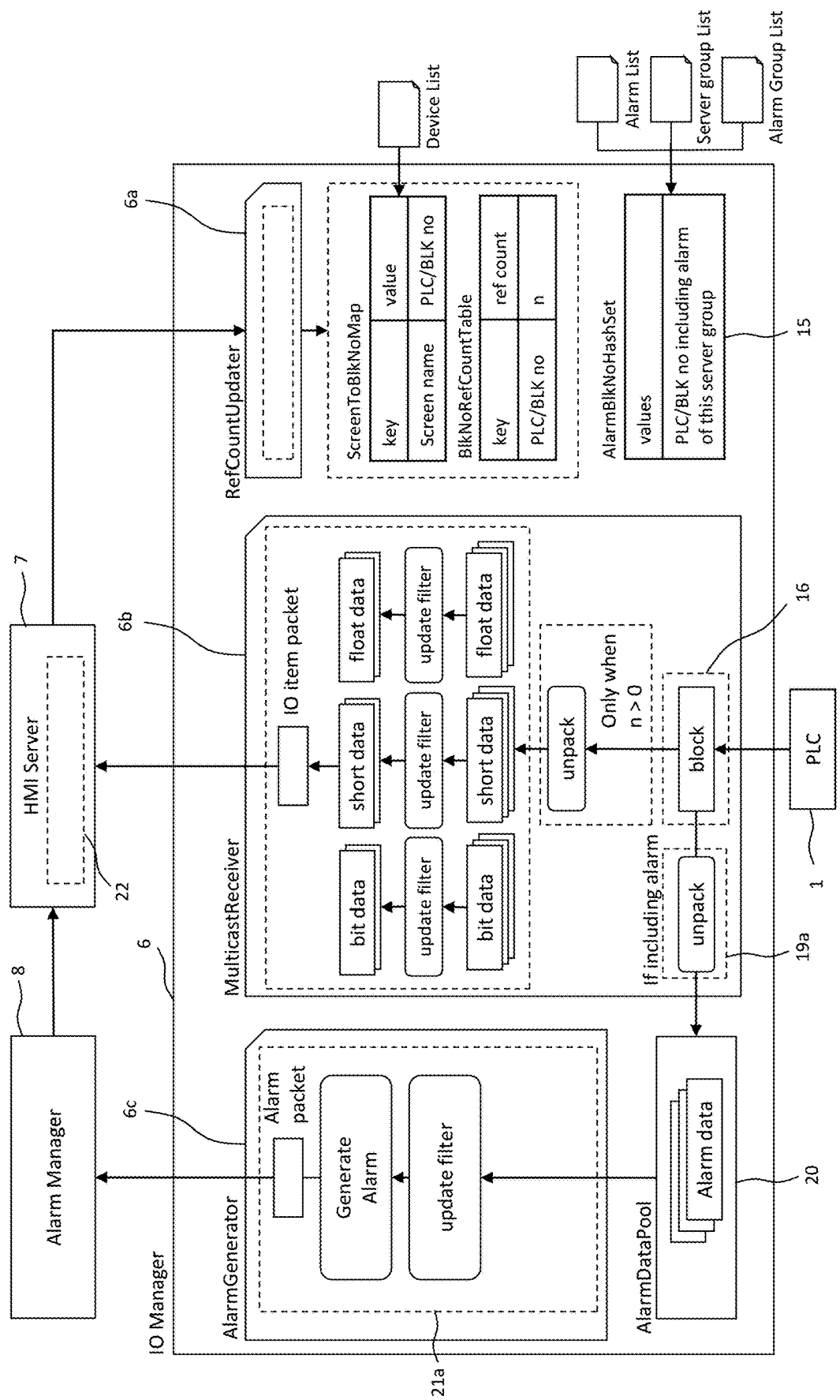
FIG. 6 is a block diagram illustrating overview of functions held by an HMI server apparatus according to Embodiment 2 of the present invention.

FIG. 6 is a block diagram illustrating overview of functions held by the HMI server apparatus 2 according to Embodiment 2. A configuration of the HMI server apparatus 2 illustrated in FIG. 6 is similar to the configuration illustrated in FIG. 2 except that the buffering processing 19 is replaced with buffering processing 19a, and the alarm filtering processing 21 is replaced with alarm filtering processing 21a.

In the buffering processing 19a, in a case where a set of alarm signals is included in the block data received for every first period, the set of alarm signals included in the block data is extracted, and the extracted set of alarm signals is temporarily stored in the alarm buffer memory 20. The first period is, for example, several milliseconds to several hundred milliseconds.

In the alarm filtering processing 21a, the set of alarm signals stored in the alarm buffer memory 20 is taken out for every second period that is longer than the first period. Further, in the alarm filtering processing 21a, alarm signals each having a value varied from a previous value are extracted from the taken-out set of alarm signals. The second period is, for example, several seconds.

2-3. Buffering Processing According to Embodiment 2

Figure 7:
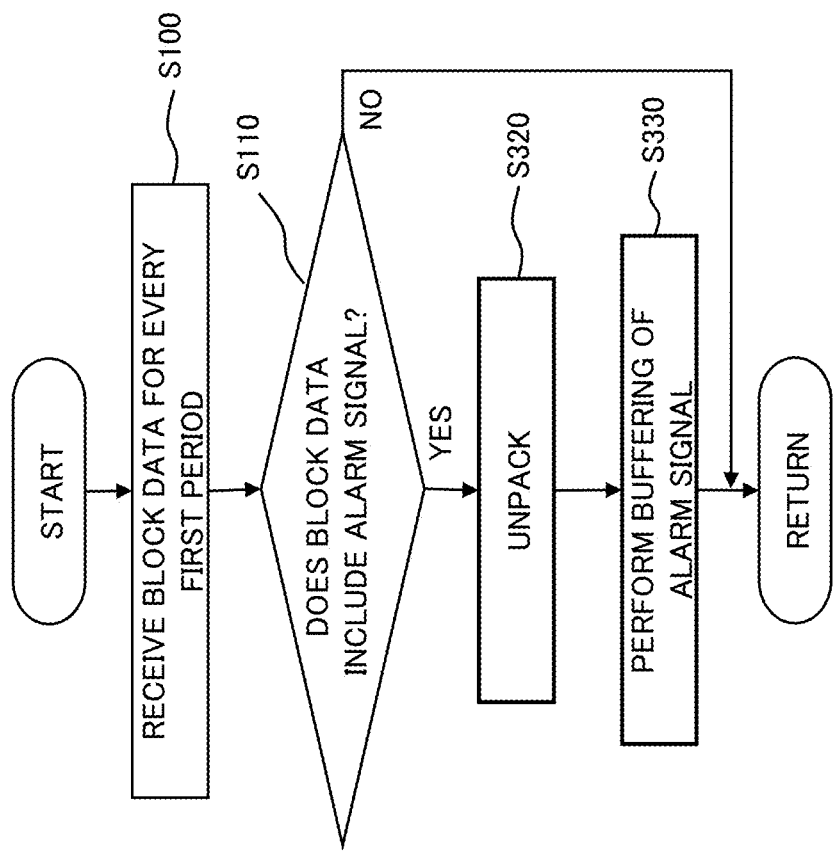
FIG. 7 is a flowchart to explain buffering processing according to Embodiment 2 of the present invention.
Figure 9:
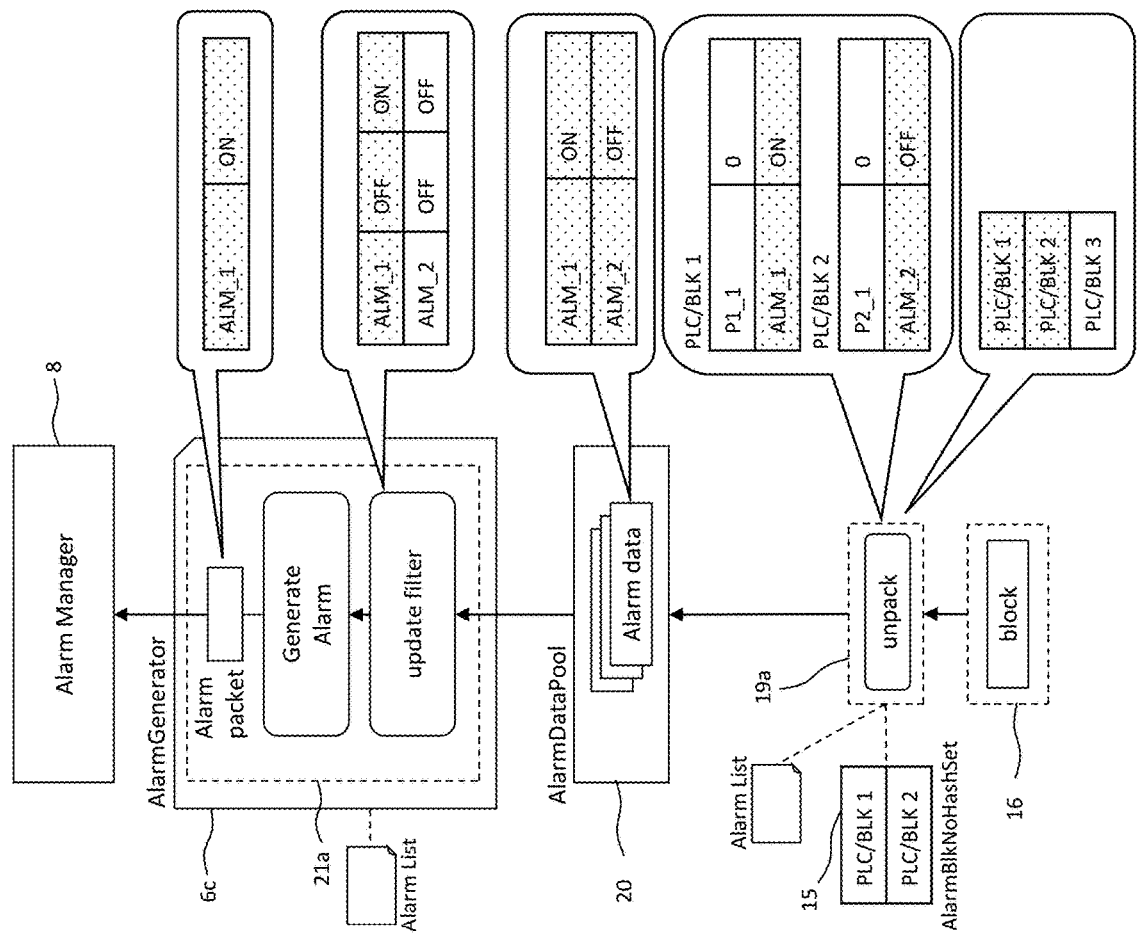
FIG. 9 is a diagram to explain specific examples of the buffering processing and the alarm filtering processing according to Embodiment 2 of the present invention.

First, the buffering processing 19a illustrated in FIG. 6 is described with reference to FIG. 7 and FIG. 9. FIG. 7 is a flowchart to explain the buffering processing 19a according to Embodiment 2. FIG. 9 is a diagram to explain a specific example of the buffering processing 19a according to Embodiment 2. A flow illustrated in FIG. 7 is repeatedly performed for every first period.

Processing in steps S100 and S110 is similar to the processing in FIG. 3. In step S100, in the reception processing 16, the block data transmitted from the PLC 1 is received for every first period.

In the example illustrated in FIG. 9, in the reception processing 16, the block data (block number "PLC/BLK 1") is received in the first period of a first time. In the reception processing 16, the block data (block number "PLC/BLK 2") is received in the first period of a second time. In the reception processing 16, the block data (block number "PLC/BLK 3") is received in the first period of a third time.

In step S110, in the buffering processing 19a, it is determined whether a set of alarm signals is included in the received block data, by referring to the alarm block information 15. As a result, only the block data including alarm signals is extracted. In a case where a set of alarm signals is included in the received block data, processing in step S320 is performed on the received block data. In contrast, in a case where a set of alarm signals is not included in the received block data, the received block data is discarded, and the flow is terminated. In a case where the determination condition in step S110 is not established, the block data can be discarded, which can reduce a load by the subsequent processing.

In the example illustrated in FIG. 9, as block numbers of the block data including alarm signals, "PLC/BLK 1" and "PLC/BLK 2" are registered in the alarm block information 15. Therefore, the processing in step S320 is then performed on the block data having the block number "PLC/BLK 1" and the block data having the block number "PLC/BLK 2" registered in the alarm block information 15. In contrast, the block data having the block number "PLC/BLK 3" not registered in the alarm block information 15 is discarded.

In step S320, in the buffering processing 19a, the block data is unpacked to extract the set of alarm signals.

In the example illustrated in FIG. 9, two pieces of block data (block numbers "PLC/BLK 1" and "PLC/BLK 2") are unpacked, and alarm signals (ALM_1 and ALM_2) are extracted among four PLC signals (P1_1, ALM_1, P2_1, and ALM_2).

In the step S330, in the buffering processing 19a, the extracted set of alarm signals is temporarily stored in the alarm buffer memory 20.

In the example illustrated in FIG. 9, the two alarm signals (ALM_1 and ALM_2) are temporarily stored in the alarm buffer memory 20.

2-4. Alarm Filtering Processing According to Embodiment 2

Figure 8:
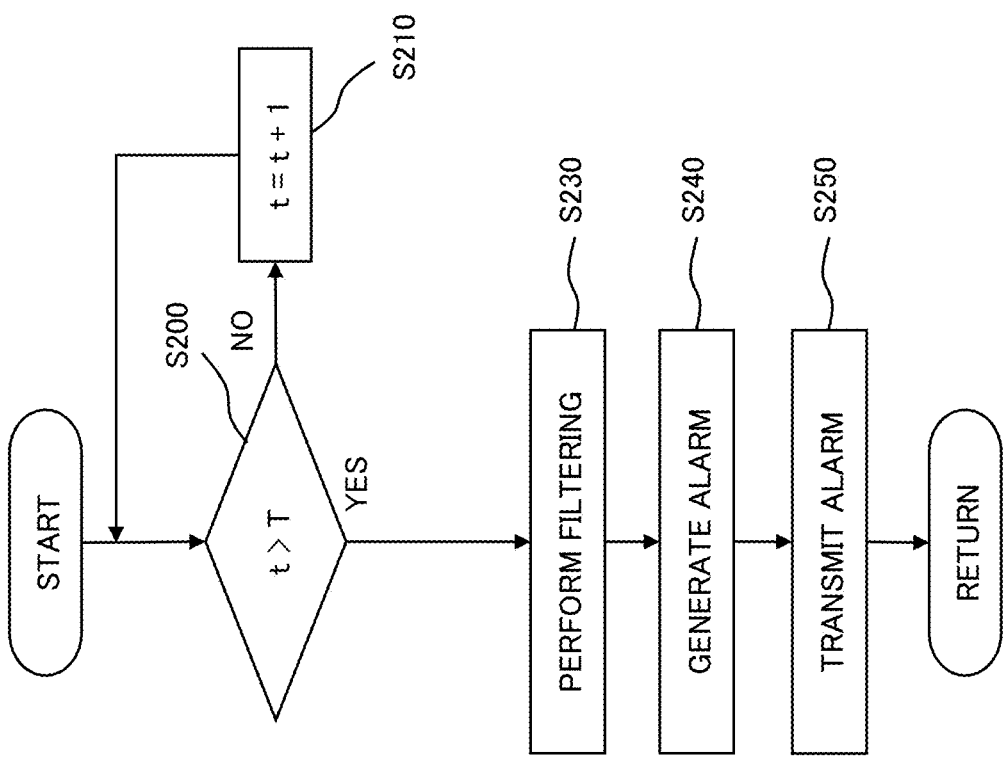
FIG. 8 is a flowchart to explain alarm filtering processing according to Embodiment 2 of the present invention.

Next, the alarm filtering processing 21a illustrated in FIG. 6 is described with reference to FIG. 8 and FIG. 9. FIG. 8 is a flowchart to explain the alarm filtering processing 21a according to Embodiment 2. FIG. 9 is a diagram to explain a specific example of the alarm filtering processing 21a according to Embodiment 2. A flow illustrated in FIG. 8 is repeatedly performed for every second period that is longer than the first period.

FIG. 8 is similar to FIG. 4 except that the processing in step S220 is omitted.

In step S200, in the alarm filtering processing 21a, it is determined whether the current count value t has reached the prescribed count value T corresponding to the second period. In a case where the determination condition is not established, the current count value t is incremented, and the processing in step S210 is performed again. In contrast, in a case where the determination condition is established, namely, in a case where the second period has elapsed, processing in step S230 is then performed.

In step S230, in the alarm filtering processing 21a, the set of alarm signals stored in the alarm buffer memory 20 is taken out. In the alarm filtering processing 21a, only the alarm signals each having a value varied from a previous value are extracted from the taken-out set of alarm signals, based on the filtering information. The filtering information includes the previous values of the respective alarm signals, and is stored in the memory 62. In a case where the previous value and the current value of an alarm signal are different from each other, operation by the HMI operator is necessary. Therefore, it is necessary to transmit the alarm signal varied in value, to the HMI server process 7. In contrast, in a case where the previous value and the current value of the alarm signal are equal to each other, such an alarm signal can be discarded, which makes it possible to reduce a load by the subsequent processing.

In the example illustrated in FIG. 9, out of the above-described two alarm signals (ALM_1 and ALM_2), the alarm signal (ALM_1) is a signal having a value varied from the previous value. In contrast, the alarm signal (ALM_2) is discarded because the previous value and the current value are equal to each other.

In step S240, in the alarm filtering processing 21a, an alarm packet including the extracted alarm signals is generated.

In the example illustrated in FIG. 9, an alarm packet including the alarm signal (ALM_1) is generated.

In step S250, in the transmission processing 22, the alarm packet is transmitted to the web browser 30 displayed on the monitor 75 (FIG. 10).

2-5. Effects

As described above, the system according to Embodiment 2 can reduce the processing load as in Embodiment 1. Further, the system according to Embodiment 2 can reduce the memory usage used for the alarm buffer memory 20 as compared with Embodiment 1.

3. Hardware Configuration Example

FIG. 10 is a block diagram illustrating a hardware configuration example of the HMI server apparatus 2, the HMI client apparatus 3, and the online data gathering apparatus 4.

The above-described processing of the HMI server apparatus 2 is realized by a processing circuit. The processing circuit includes the processor 61, the memory 62, and a network interface 63 that are connected to one another. The processor 61 realizes the functions of the HMI server apparatus 2 by executing various kinds of programs stored in the memory 62. The memory 62 includes a main storage device and an auxiliary storage device.

The above-described processing of the HMI client apparatus 3 is realized by a processing circuit. The processing circuit includes the processor 71, the memory 72, a network interface 73, an input interface 74, and at least one monitor 75 that are connected to one another. The processor 71 realizes the functions of the HMI client apparatus 3 by executing various kinds of programs stored in the memory 72. The memory 72 includes a main storage device and an auxiliary storage device. The input interface 74 includes an input device such as a keyboard, a mouse, and a touch panel. A plurality of monitors 75 may be provided.

The above-described processing of the online data gathering apparatus 4 is realized by a processing circuit. The processing circuit includes the processor 81, the memory 82, and a network interface 83 that are connected to one another. The processor 81 realizes the functions of the online data gathering apparatus 4 by executing various kinds of programs stored in the memory 82. The memory 82 includes a main storage device and an auxiliary storage device.

Although the embodiments of the present invention have been described above, the present invention is not limited to the above-described embodiments, and can be implemented while being variously modified without departing from the gist of the present invention. When the number, quantity, amount, range, or other numerical attribute of each element is mentioned in the above-described embodiments, the present invention is not limited to the mentioned numerical attribute unless it is expressly stated or theoretically defined. Further, the structures and the like described in the above-described embodiments are not necessarily essential to the present invention unless expressly stated or theoretically defined.

REFERENCE SIGNS LIST

1 Programmable logic controller (PLC)
2 HMI server apparatus
3 HMI client apparatus
4 Online data gathering apparatus
5 Computer network
6 Input/output management process
6a Reference count update thread
6b Multicast receiver thread
6c Alarm generation thread
7 HMI server process
8 Alarm management process
15 Alarm block information
16 Reception processing
19, 19a Buffering processing
20 Alarm buffer memory
21, 21a Alarm filtering processing
22 Transmission processing
30 Web browser
31 Screen
32 Supervisory screen
33 History screen
61, 71, 81 Processor
62, 72, 82 Memory
63, 73, 83 Network interface
74 Input interface
75 Monitor

The invention claimed is:

1. A Supervisory Control And Data Acquisition (SCADA) web Human Machine Interface (HMI) system comprising:
   a programmable logic controller (PLC);
   an HMI client apparatus; and
   an HMI server apparatus that are connected through a computer network,
   wherein the PLC transmits block data to the computer network for every first predetermined period, the block data including at least one of a set of input/output signals relating to field apparatuses configuring an industrial plant and a set of alarm signals,
   wherein the HMI client apparatus includes a monitor to display a web browser, and a client processor configured to execute the web browser displaying a screen including arranged alarm parts, wherein the HMI server apparatus includes a server memory, and a server processor, and wherein the server processor is configured to receive the block data transmitted from the PLC, at the first predetermined period that is set as a buffering process period, temporarily store at least the set of alarm signals included in the block data in the server memory, read out the set of alarm signals stored in the server memory at a second predetermined period, the second predetermined period being set as a data update period and being longer than the first predetermined period, extract specific alarm signal among the set of alarm signals, the specific alarm signal having a value changed from a previous value at previous point that is stored in the server memory, and transmit the extracted specific alarm signal to the HMI client apparatus so that the HMI client apparatus displays, on the web browser, the specific alarm signal with changing display states of alarm parts arranged on a screen of the web browser, based on the received extracted alarm signals.

2. The SCADA web HMI system according to claim 1, wherein
the server processor is configured to temporarily store the received block data in the server memory, and
the server processor is configured to read out the block data stored in the server memory at the second predetermined period,
the server processor is configured to extract the specific alarm signal among the set of alarm signals that is extracted from the block data, the specific alarm signal having a value changed from a previous value at previous point that is extracted from the server memory.

3. The SCADA web HMI system according to claim 2, wherein the block data is transmitted from the PLC by multicast or broadcast for every first predetermined period.

4. The SCADA web HMI system according to claim 3, further comprising an online data gathering apparatus, wherein
the online data gathering apparatus periodically receives the block data from the PLC, stores historical data on all of signals included in the block data, and transmits the historical data in response to a request from the HMI client apparatus, and
the HMI client apparatus requests the historical data to the online data gathering apparatus under a condition that the screen currently displayed on the web browser is a history screen, and displays the historical data received from the online data gathering apparatus on the history screen.

5. The SCADA web HMI system according to claim 1, wherein
the server processor is configured to extract the set of alarm signals included in the block data, and temporarily store the extracted set of alarm signals in the server memory.

6. The SCADA web HMI system according to claim 5, wherein the block data is transmitted from the PLC by multicast or broadcast for every first predetermined period.

7. The SCADA web HMI system according to claim 6, further comprising an online data gathering apparatus, wherein
the online data gathering apparatus periodically receives the block data from the PLC, stores historical data on all of signals included in the block data, and transmits the historical data in response to a request from the HMI client apparatus, and
the HMI client apparatus requests the historical data to the online data gathering apparatus under a condition that the screen currently displayed on the web browser is a history screen, and displays the historical data received from the online data gathering apparatus on the history screen.

8. The SCADA web HMI system according to claim 1, wherein the block data is transmitted from the PLC by multicast or broadcast for every first predetermined period.

9. The SCADA web HMI system according to claim 8, further comprising an online data gathering apparatus, wherein
the online data gathering apparatus periodically receives the block data from the PLC, stores historical data on all of signals included in the block data, and transmits the historical data in response to a request from the HMI client apparatus, and
the HMI client apparatus requests the historical data to the online data gathering apparatus under a condition that the screen currently displayed on the web browser is a history screen, and displays the historical data received from the online data gathering apparatus on the history screen.

10. The SCADA web HMI system according to claim 1, wherein the HMI client apparatus displays, on the web browser, the specific alarm signal with changing display states of alarm parts arranged on the screen of the web browser, based on the received extracted alarm signals, by changing numerical value, character, color, or shape of the alarm parts on the screen.

11. The SCADA web HMI system according to claim 1, wherein the server processor is further configured to discard an alarm signal other than the specific alarm signal in the set of alarm signals, the alarm signal other than the specific alarm signal does not have a value changed from a previous value at previous point that is stored in the server memory.

12. The SCADA web HMI system according to claim 1, wherein the server processor is further configured to discard the block data under a condition that the block data does not include the set of alarm signals.

13. The SCADA web HMI system according to claim 1, wherein the specific alarm signal is a signal that is not required for real-time processing.

14. A Human Machine Interface (HMI) server comprising:
a memory; and
processing circuitry configured to
receive a block data transmitted from a programmable logic controller (PLC), at a first predetermined period that is set as a buffering process period, the PLC being connected to the HMI server via a computer network for a Supervisory Control And Data Acquisition (SCADA) web HMI system including the PLC, an HMI client apparatus and the HMI server, the block data including at least one of a set of input/output signals relating to field apparatuses configuring an industrial plant and a set of alarm signals,
temporarily store at least the set of alarm signals included in the block data in the memory,
read out the set of alarm signals stored in the memory at a second predetermined period, the second predetermined period being set as a data update period and being longer than the first predetermined period, extract specific alarm signal among the set of alarm signals, the specific alarm signal having a value changed from a previous value at previous point that is stored in the server memory, and transmit the extracted specific alarm signal to the HMI client apparatus so that the HMI client apparatus displays, on a web browser, the specific alarm signal with changing display states of alarm parts arranged on a screen of the web browser, based on the received extracted alarm signals.

15. The HMI server according to claim 14, wherein, on the web browser of the HMI client apparatus, the specific alarm signal is displayed with changing display states of alarm parts arranged on the screen of the web browser, based on the received extracted alarm signals, by changing numerical value, character, color, or shape of the alarm parts on the screen.

16. The HMI server according to claim 14, wherein the block data is transmitted from the PLC by multicast or broadcast for every first predetermined period.

17. The HMI server according to claim 14, wherein the processing circuitry is further configured to discard an alarm signal other than the specific alarm signal in the set of alarm signals, the alarm signal other than the specific alarm signal does not have a value changed from a previous value at previous point that is stored in the server memory.

18. The HMI server according to claim 14, wherein the processing circuitry is further configured to discard the block data under a condition that the block data does not include the set of alarm signals.

19. The HMI server according to claim 14, wherein the specific alarm signal is a signal that is not required for real-time processing.

* * * * *